United States Patent [19]
Marino

[11] 3,924,253
[45] Dec. 2, 1975

[54] INDICATING SYSTEM USING PULSED OPTICAL TECHNIQUES

[75] Inventor: Francis C. Marino, Dix Hills, N.Y.

[73] Assignee: Redactron Corporation, Hauppauge, N.Y.

[22] Filed: Jan. 16, 1974

[21] Appl. No.: 433,846

[52] U.S. Cl.......... 340/258 B; 307/283; 315/200 A; 331/75; 331/111
[51] Int. Cl.² ........................................ G08B 13/18
[58] Field of Search .................. 340/258 B; 331/75; 331/111; 315/200 A; 307/283

[56] References Cited
UNITED STATES PATENTS

| | | | |
|---|---|---|---|
| 3,349,255 | 10/1967 | McAvoy | 307/283 X |
| 3,534,351 | 10/1970 | Harnden et al. | 340/258 B |
| 3,737,731 | 6/1973 | Zeewy | 331/111 |
| 3,749,918 | 7/1973 | Jones | 340/258 B |
| 3,816,745 | 6/1974 | Primm et al. | 340/258 B |
| 3,858,063 | 12/1974 | Saleme | 331/111 |

*Primary Examiner*—David L. Trafton
*Attorney, Agent, or Firm*—Hane, Baxley & Spiecens

[57] ABSTRACT

A system for indicating the state of transparency of an optical path has: at one end of the path, a light pulse generator which includes a solid state means, such as a light-emitting diode, which emits light whenever current of sufficient amplitude passes therethrough and a periodically operating switching means which periodically causes current to flow from a current source through the solid state means; and at the other end of the path, a transducer for converting light pulses to electrical pulses which pass through an A.C. coupled amplifier to an indicator.

5 Claims, 1 Drawing Figure

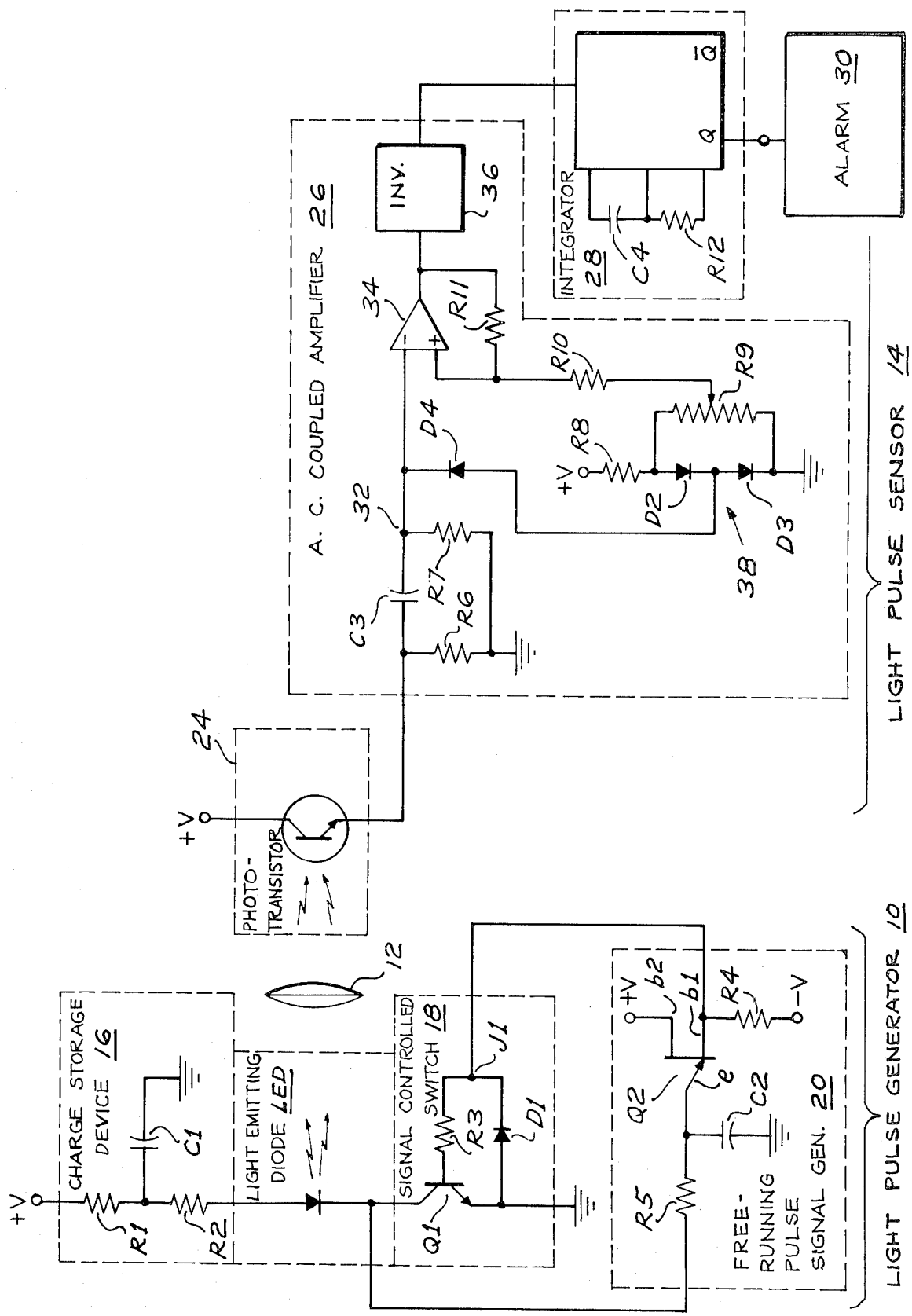

INDICATING SYSTEM USING PULSED OPTICAL TECHNIQUES

This invention pertains to indicating systems and more particularly to systems employing solid state techniques to indicate the transparency of an optical path.

Indicating systems which indicate the transparency of an optical path have many uses. In general, a light detector is aimed at a light source such that an optical path is defined between the source and the detector. If anything crosses the path the transparency changes and an alarm is given. Hence, such indicators are used for all kinds of instrusion alarms, limit or travel indicators and the like. One specialized use is to indicate holes or breaks in a paper or magnetic tape. In such systems, an opaque tape intersects the optical path between a light source and a light detector. Normally, the path is opaque since the opaque tape is in the path, however, when there is a hole or break in the tape, the path becomes transparent and the light detector "sees" the light source and gives an indication.

Heretofore, such systems used incandescent lamps as light sources. However, such lamps are bulky, power consuming and have a short lifetime which decreases their reliability. In many systems requiring high reliability, circuitry is added to monitor the operation of the lamp per se. A much better solution is the use of solid state devices such as light emitting diodes (LEDs). LEDs are very small, operate instantaneously, consume very little power and have a long life. But, due to the physical size and/or power limitations, it is now uncommon to encounter situations in which presently available LEDs cannot yield the required light intensity to trigger the detector without exceeding the power dissipation of diode.

It is, therefore, a general object of the invention to provide a system of the kind discussed above, which uses solid state light-emitting devices such as LEDs or the like, as light sources wherein the sources have many more times their light intensity without exceeding the specified average power dissipation of the devices.

The invention relies on the fact that unlike the incandescent lamp, a LEd or the like, emits light proportionally to and coincident in time with the current applied to it. So long as a suitable light-detecting transducer (such as a phototransistor which is responsive to light at electronic speeds) is employed as part of the sensor portion of the system, the LED may be pulsed at suitably high current levels and at a predetermined duty cycle so as to yield improved magnitudes of light intensity while maintaining the average power dissipation of the LED within safe limits. Thus, it is possible to safely obtain at least five to twenty times more light intensity from the LED without exceeding its specific average power dissipation.

When a pulsed light source is employed there immediately arises an important advantage in that the system is immune to constant ambient or background lighting if the sensing portion of the system utilizes A.C. coupling techniques. The reason is that the ambient light introduces D.C. or low frequency components in the signal from the sensing transducer which are not passed by the A.C. coupling elements.

Other objects, features and advantages of the invention will be apparent from the following detailed description when read with the accompanying drawing whose sole FIGURE shows, by way of example and not limitation, a schematic diagram of the presently preferred embodiment of the invention.

The system shown in the sole FIGURE comprises a light pulse generator 10 at one end of an optical path indicated schematically by lens 12 and a light pulse sensor 14 at the other end of the path. In operation, light pulse generator 10 periodically emits pulses of light which are sensed by light pulse sensor 14 provided the optical path is transparent, i.e., not blocked by an opaque object such as a magnetic tape. The light pulses are converted to an electrical signal to give an alarm. Thus, for example, in a system for monitoring holes in a magnetic tape which intersects the optical path while being moved between reels, an alarm will be given when a hole in the tape intersects the optical path. In this way, an indication is given that the tape is defective. If holes are purposely placed near either end of the tape then the system can give indications as to when the end of the tape is being reached.

More specifically, the light pulse generator 10 comprises: a charge storage device 16 in the form of resistors R1 and R2 connected in series to voltage source +V, and storage capacitor C1 connected between the junction of the resistors and ground (a reference voltage source); a solid state light-emitter in the form of a light-emitting diode LED having an anode connected to the free end of resistor R2; a signal controlled switch 18 in the form of NPN transistor Q1 having a collector connected to the anode of light-emitting diode LED, an emitter connected to ground, and via saturation limiting, diode D1 to junction J1, and a base connected via resistor R3 to junction J1; and a free-running pulse signal generator 20 in the form of unijunction transistor Q2 having a second base b2 connected to voltage source +V, a first base $b1$ connected via resistor R4 to voltage source $-V$ and also to junction J1, and an emitter connected via timing capacitor C2 to ground and via timing resistor R5 to the junction of light-emitting diode LED and signal controlled switch 18.

In operation, the periodic pulsing relies on the properties of the unijunction transistor Q2. In particular, the base-emitter resistance ($e-b1$) of the transistor is very high until a certain peak voltage is applied to the emitter. Then the resistance becomes negative and the transistor is said to avalanche to a relatively low resistance or "valley" state. Then, if the emitter current is reduced below a certain magnitude, called the "valley" current, the transistor reverts to the original high resistance state. With this in mind, the self-pulsing operation will be described.

During the high resistance state of transistor Q2, timing capacitor C2 charges toward the peak voltage from source +V via resistors R1, R2, diode LED and charging timing resistor R5. Since the resistance of timing resistor R5 is chosen to be so much greater than the resistances of resistors R1 and R2 and diode LED, the charging time is a function primarily of the time constant of charging timing resistor R5 and timing capacitor C2. In addition, the charging current is sufficiently small to cause no light emission from diode LED. At the same time, transistor 01 is cut off because its base-emitter junction is reversed biased due to a small current flowing from ground via diode D1 through resistor R4. In addition, virtually no current flows from the emitter or transistor Q2 during the high resistance state of transistor Q2. Hence, substantially all the current passing through diode LED is charging current for capacitor C2. When the voltage across capacitor C2 reaches the peak voltage of the unijunction transistor Q2, it "fires" or avalanches causing a rapid discharge of timing capacitor C2 via the emitter e and base b1 of transistor Q2, and discharge timing resistor R3 and the base-emitter junction of transistor Q1. Transistor Q1 conducts heavily since it is virtually a short circuit. Heavy current flows from storage capacitor C1, diode LED (which now emits light), and the collector-emitter junction of transistor Q1 to ground. The length of time of the heavy conduction is determined primarily by the time required for timing capacitor C2 to discharge via timing resistor R3, i.e., the time constant of capacitor C2 and resistor R3. When timing capacitor C2 has discharged sufficiently so that the current flow is below the "valley" current, transistor Q2 reverts to the high resistance state, transistor Q1 is again cut off and the cycle repeats.

It should be noted that while transistor Q1 is conducting it not only provides the high current path for diode LED but removes all current flow through resistor R5 to insure that capacitor C2 will sufficiently discharge so that the transistor Q2 will switch out of the avalanche state.

Furthermore, it should be noted that the charge drained from storage capacitor C1 during the short interval when heavy current flowed via the light-emitting diode LED and transistor Q1 is restored by source +V via resistor R1 during the longer time interval when the timing capacitor C2 is recharging toward the peak voltage.

The light pulse sensor 14 comprises: a transducer for converting light energy to electric signals in the form of phototransistor 24 having its emitter connected to source +V, its base exposed to incoming light and its emitter acting as an output terminal; an A.C. coupled amplifier 26 having an A.C. coupling network 32, a comparator 34, and an inverter 36 serially connected between the emitter of phototransistor 24 and the output of the amplifier 26 with a voltage level establishing network 38 connected to coupling network 32 to provide D.C. restoration and to a second input or comparator 34 to provide a reference signal; an integrator 28 in the form of a retriggerable/resettable monostable multivibrator for integrating pulses from amplifier 26 to a D.C. level signal; and an alarm 30. Furthermore, within A.C. coupled amplifier 26, the coupling network comprises a pi-network with coupling capacitor C3 and terminal resistors R6 and R7 connecting the respective ends of capacitor C3 to ground. The voltage level establishing network comprises dropping resistor R8 and diodes D2 and D3 connected in series between source +V and ground. The junction of the cathode of diode D2 and the anode or diode D3 is connected to the anode of diode D4 whose cathode is connected to the junction of the output of coupling network 32 and the minus input of comparator 34 to provide a D.C. restoration level for the pulse signals. In addition, a potentiometer R9 is connected across diodes D2 and D3 with its top connected via resistor R10 to the plus input of comparator 34 to provide a reference voltage. Comparator 34 can be a conventional operational amplifier wired as a difference amplifier wherein the reference voltage fed to the plus input provides noise clipping of the signal. The inverter 36 is merely provided for signal inversion and in many cases may be dispensed with. Integrator 28 has the property of emitting from its output a pulse of a given duration whenever it receives a trigger pulse at its input. However, it has the further property that if it receives another trigger pulse before the output pulse terminates it emits another output pulse having said given duration. Hence, as long as the time between trigger pulses is less than the duration of the output pulse, the output of integrator 28 will be, say, positive, and only return to negative when the trigger pulses are absent for longer than the duration of an output pulse. The time constant of the output pulses is chosen by means of resistor R and capacitor C4.

In operation, light from path 12 plus ambient light excites phototransistor 24 which emits a signal which, if light pulses are being received, comprises a periodically recurring pulse signal having a D.C. level above ground due to the ambient light. However, coupling network 32 acts as a filter to pass only the pulse signal component. Because of the asymmetry of the input signal and the differences in source and terminating impedances, the pulse signal train at the output of network 32 will be at a negative voltage. However, this is restored to practically ground level by means of diode D4.

Hence, a pulse signal is fed to one input of comparator 34. By means of feedback resistor R11 and resistor R10 connected to potentiometer R9, a noise clipping level as well as a desired amount of positive feedback for hysteresis are provided so that reliable switching of the comparator between its output saturation levels is obtained only for the signals generated by received light pulses.

Inverter 36 merely inverts the received pulses so that they are the correct polarity to trigger integrator 28. When the pulses are received the output Q of the integrator goes positive and activates alarm 30 as long as pulses are received indicating the optical path is open, i.e., for the example discussed, a hole or break in the tape.

It should now be apparent that pulsing the light source provides several advantages. In one circuit built according to the teachings of the invention, the light emitting diode was pulsed with 300 ma. of current for 20 microseconds every 100 microseconds. Thus, the average current through the diode was 60 ma. due to the 20% duty cycle. However, the light intensity during the pulse interval is 7 to 10 times that obtained from the diode if it were supplied with a continuous current of 60 ma., while the average power dissipation in the diode is only 70% of specified safe operating value. In addition, because of the use of charge storage device 16 the heavy pulsed current to the diode is supplied by capacitor C1 while source +V only supplies an average current of little more than 60 ma. Thus, to the source +V the light pulse generator 10 appears to be merely a resistive load drawing little more than 60 ma. while the light intensities correspond to a 300 ma. load.

Furthermore, by using a pulsed source an A.C. coupled sensor can be employed. Because an A.C. coupled sensor is used, all ambient light which generates a D.C. signal, is rejected. Therefore, the system can be used under severe ambient light conditions.

While only one embodiment of the invention has been shown and described in detail, there will now be obvious to those skilled in the art, many modifications and variations satisfying many or all of the objects of the invention.

What is claimed is:

1. A light pulse generator comprising a reference potential means, a power supply, first and second serially connected current limiting resistors, the free end on said first current limiting resistor being connected to said power supply, a storage capacitor connected between the junction of said resistors and said reference potential means, a light emitting diode having one terminal thereof connected to the free end of said second current limiting resistor and a second terminal, a signal controlled switch for controllably connecting the other terminal of said light emitting diode to the reference potential means and having a control input, a unijunction transistor having an emitter, and first and second bases, a load resistor having one end connected to the first of said bases, means for applying an operating potential between the second of said bases and the other end of siad load resistor, a timing resistor and a timing capacitor connected in that order between the other terminal of said light emitting diode and said reference potential means, means for connecting the junction of said timing resistor and timing capacitor to the emitter of said uni-junction transistor, and means for connecting the first base of said uni-junction transistor to the control input of said signal controlled switch.

2. An indicating system for indicating the state of transparency of an optical path comprising: a light pulse generator at one end of the optical path, said light pulse generator comprising a source of an electrical current, solid state means for emitting light whenever an electrical current flows therethrough, a switching means for switching between current non-conductive and current conductive states in response to the receipt of signals, means for connecting said solid state means between said source and said switching means so that current flows from said source via said solid state means to said switching means whenever the latter is in the conductive state, and a free-running pulse signal generator means connected to said switching means for transmitting periodically recurring signals thereto said free-running pulse generator means comprising a unijunction transistor having an emitter, and first and second bases, a resistor having one end connected to the first of said bases, means for applying an operating potential between the second of said bases and the other end of said resistor, a timing resistor and a timing capacitor connected in that order between the junction of said solid state means and said switching means and a reference potential means, and means for connecting the junction of said timing resistor and timing capacitor to the emitter of said unijunction transistor; and a light pulse sensor at the other end of the optical path, said light pulse sensor comprising a transducer means for converting light energy to electrical signals, amplifier means connected to said transducer means for amplifying only A.C. signals received from said transducer means, and indicator means connected to said amplifier means for giving an indication whenever said amplifier means transmits an A.C. signal.

3. The indicating system of claim 2 wherein said solid state means is a light-emitting diode.

4. The indicating system of claim 3 wherein said source of electrical current comprises a power supply, a storage capacitor and a further resistor connecting said storage capacitor to said power supply.

5. The indicating system of claim 2 wherein said indicator means includes integrator means which yields a continuous signal as long as it receives pulse signals which recur within a given time interval.

* * * * *